Oct. 31, 1939.　　　　　E. NICHOLSON　　　　　2,178,185
MACHINE FOR WASHING, DRYING, AND POLISHING FRUITS
Filed Sept. 6, 1934　　　　4 Sheets-Sheet 1

Inventor
Emmett Nicholson
By Milans & Milans
Attorneys

Oct. 31, 1939.  E. NICHOLSON  2,178,185
MACHINE FOR WASHING, DRYING, AND POLISHING FRUITS
Filed Sept. 6, 1934  4 Sheets-Sheet 2
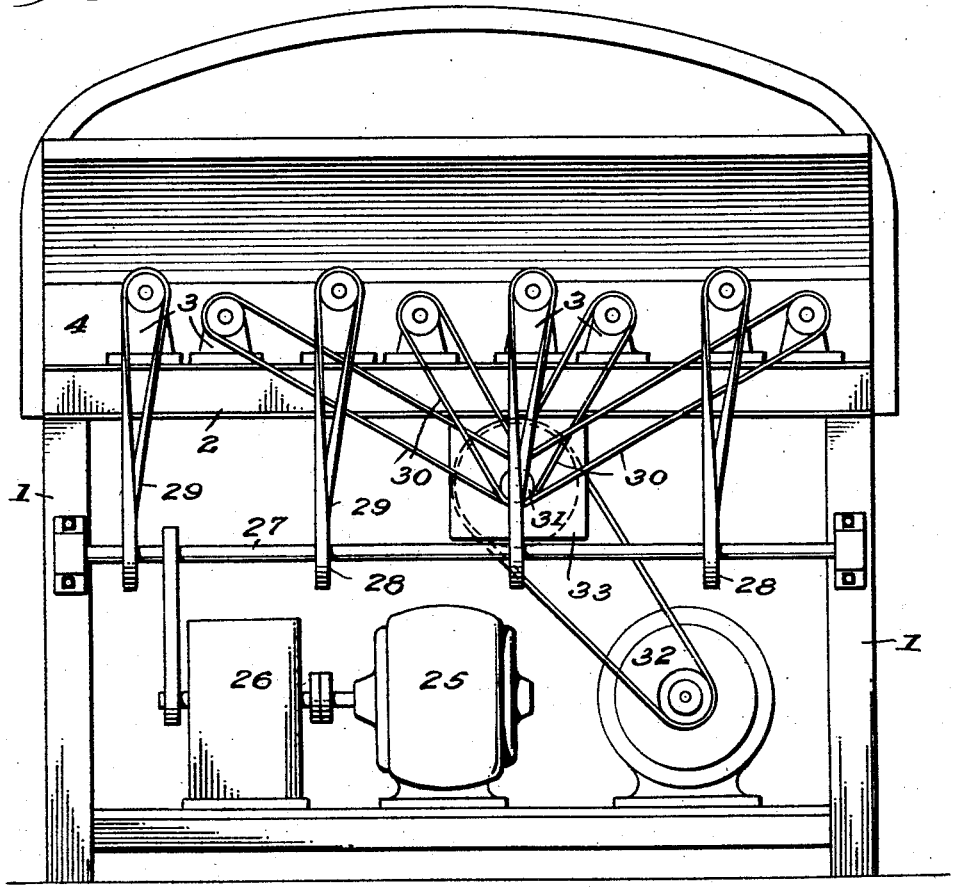
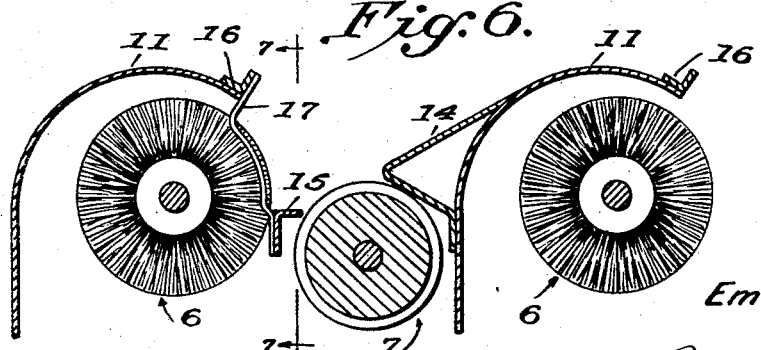
Inventor
Emmett Nicholson

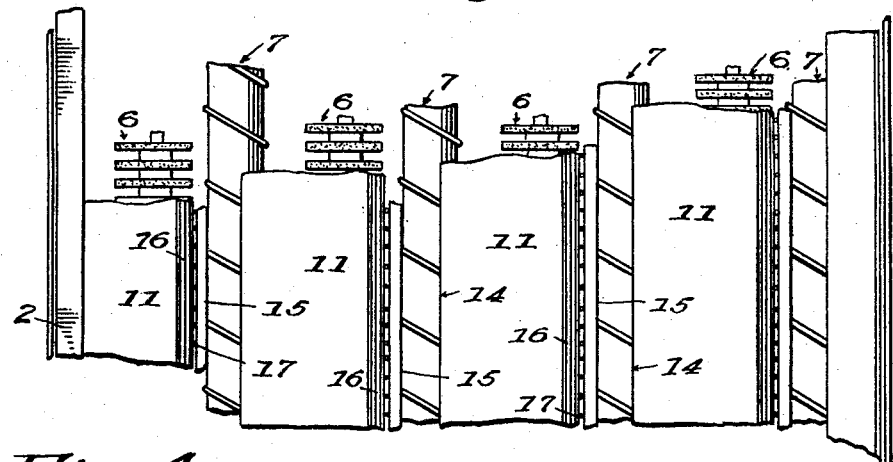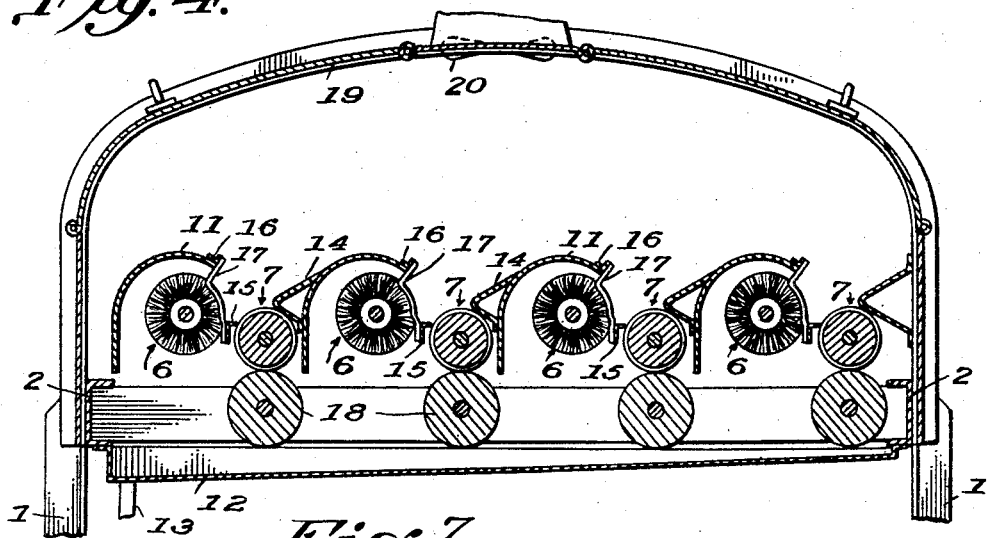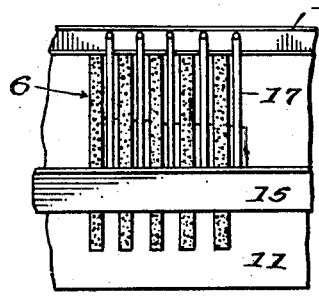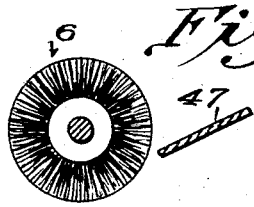

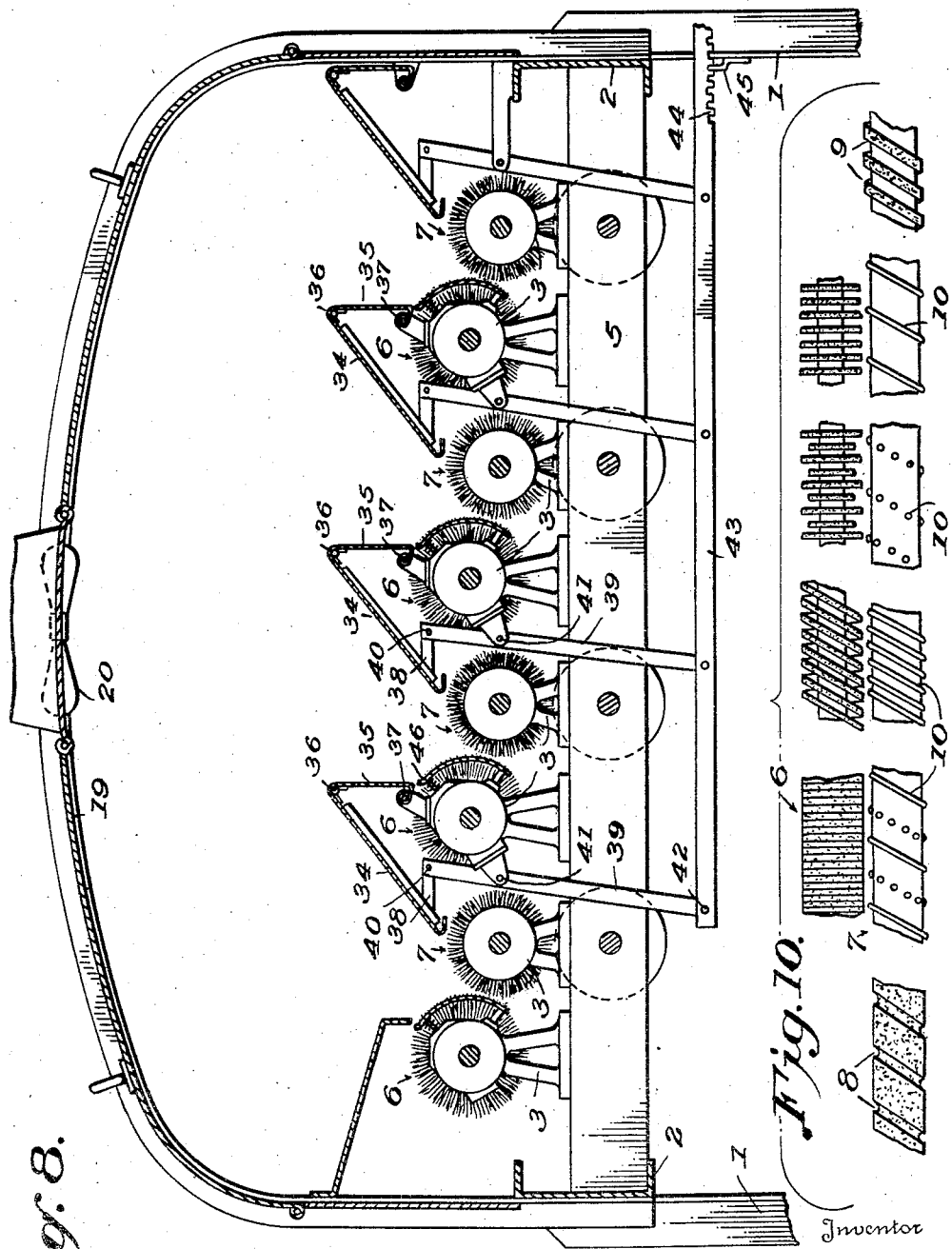

Patented Oct. 31, 1939

2,178,185

UNITED STATES PATENT OFFICE 2,178,185

MACHINE FOR WASHING, DRYING, AND POLISHING FRUITS

Emmett Nicholson, Winter Park, Fla., assignor to Ken-Jon, Inc., Orlando, Fla.

Application September 6, 1934, Serial No. 742,965

7 Claims. (Cl. 146—202)

This invention relates to machines primarily designed for drying fruit, and fundamentally the invention has for its object the provision of an improved method and machine for drying fruit by subjecting the same to a high speed brushing action, to rid the skin of the fruit of moisture and dry the same, as after some preliminary washing treatment, while preventing the disadvantageous throwing of the fruit about during the brushing operation.

More specifically, the invention includes a specially advantageous arrangement for, or manner of treatment of the brushing action on the fruit whereby to eliminate, as far as possible, the tendency of the fruit to be thrown out of or away from the treating zone, this being preferably accomplished by having the contacting of the fruit with the brush at the side of the brush or at a point a little above a point horizontally opposite the axis of the brush.

The invention further embraces certain new and useful improvements in a machine for washing, drying, and polishing fruits or the like, and deals particularly with a type of structure wherein said operations are attained by associating a feed mechanism with a rotary brush element which effectively washes or scrubs the fruit, then dries, and finally polishes the same during its transit through the machine.

Features of improvement include the provision of a high speed revolvable body or member which will initially take the moisture from the surface of the fruit or vegetable undergoing treatment and will then dispense said moisture through centrifugal action or force; the provision of a feed mechanism wherein the fruit or the like is subjected to a turning action so that all surfaces thereof will be acted upon by the revolvable body or brush member; the provision of a guard for use in some instances with the high speed brush to control the degree of peripheral contact of the brush with the fruit or vegetable undergoing treatment; the provision of other guard means that may be availed of and found helpful in preventing the fruit or the like from being centrifugally thrown from the machine; the provision of a member which is associated with relatively slow-moving feed mechanism to remove the moisture that accumulates thereon; and means for adjusting said other guard means to accommodate fruit or other articles being treated in the machine.

These and other objects will readily present themselves to those skilled in the art when the following specification is read in connection with the attached drawings wherein I have disclosed the preferred embodiments of my invention, but I wish it understood that variations in structural details may be resorted to without departing from the spirit of my invention. The scope of protection will be apparent from the appended claims.

In the attached drawings, similar letters of reference indicate like parts throughout the several views, wherein Figure 1 is a side elevation of the machine for handling the fruit or the like;

Figure 3 is an end view illustrating the drive to the rotating brush and conveyor elements;

Figure 4 is a cross-sectional view taken on line 4—4 of Figure 1;

Figure 5 is a fragmentary plan view illustrating the hood, the guard fingers and the conveyor roll or member;

Figure 6 is an enlarged view of the guard fingers, the shield, and the rotary conveyor and brush cleaning element;

Figure 7 is a front view of the guard element showing its manner of association with the high speed brush. This view is taken on line 7—7 of Figure 6, looking in the direction of the arrows;

Figure 8 is a sectional view showing a modified form of guard which may be used;

Figure 9 is a further modification suggesting the use of a belt conveyor in lieu of the roller conveyor; and Fig. 10 is a composite view illustrating various forms of brushes and conveyors which may be used if desired.

Figure 1:
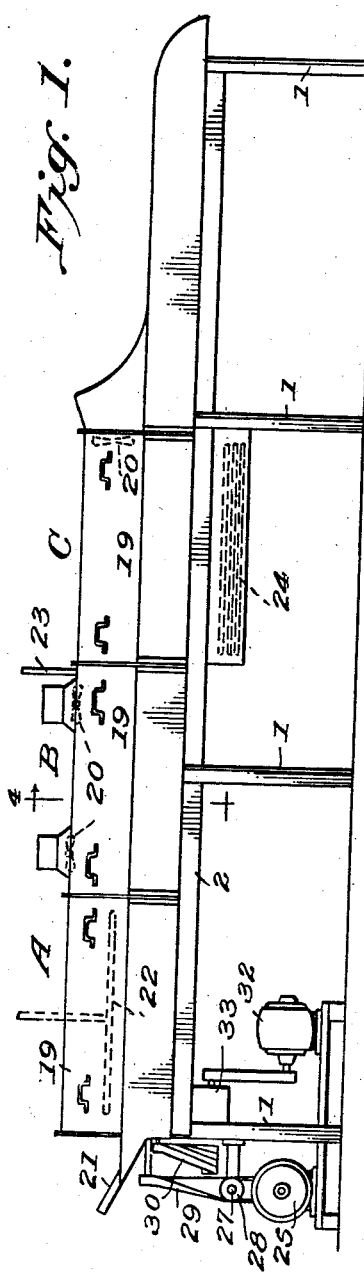

Suitable framework illustrated by legs 1 and a base structure 2 form the support for the washing, drying, and polishing sections designated by characters A, B, and C, respectively. Journals 3 are engaged within the end walls 4 of the base structure 2, and if desired additional journals may be provided on cross supports 5 arranged at spaced intervals and extending from side wall to side wall of the base structure 2.

Extending longitudinally of the machine and rotatably supported in the journals 3 are a series of pairs of rotary members. The member designated 6 is termed the cleaning or polishing brush, while 7 indicates the feed member. The feed member 7 may be constructed by providing a spiral wrapping or rib around the surface of a cylinder or by spirally grooving the bristles of a brush. It may further take the form wherein the bristles are set in a spiral, or as suggested in one of the modified forms this member may be a travelling belt. If both members 6 and 7 are made in brush form it is preferred to have the bristles of both brushes waterproofed in order to aid in the expulsion of the moisture therefrom. The cleaning brush 6 may have its bristles set in any desired formation, as suggested in Figure 10, for instance; but is is preferred that sufficient space be provided therebetween to overcome the tendency of capillary attraction and at the same time to allow the accumulated moisture to be readily thrown off.

In the present machine it has been found desirable to rotate the brush at a relatively high speed, it having been ascertained that satisfactory drying begins or may be accomplished at a peripheral speed of 900 feet per minute, while the feed member 7 is rotated at a relatively low peripheral speed, from say 100 to 200 feet per minute as a minimum depending upon the desired capacity or output of the machine. It should be kept in mind, however, that the speed of the brushes is dependent on the size of the brush and the peripheral speed thereof necessary to throw off water. At a speed substantially below that indicated above, the brush will not throw off enough water to be altogether satisfactory. Obviously, the brush can be operated at a much higher speed, as governed by temperature, humidity, cost of increased speed, etc., readily ascertained from conditions entering any given operation.

The action of the feed member 7 is to transport the fruit or the like undergoing treatment in the machine and while in transit to present said fruit to the rotating action of the cleaning brush 6. The surface of the feed brush may be given a spiral formation, either by grooving the bristles as shown at 8, or by arranging the bristles in a spiral formation as shown at 9, or by providing spiral ribs or protuberances on a cylinder as suggested at 10, or by any of the other forms shown in Figure 10. However, as can be seen from the proportion of the parts in Fig. 10, the depth of the spiral is to be relatively slight so that the article will not be confined within the groove of the spiral but may move out and over the same in its passage through the valley, as for instance, when it is being crowded or pushed by on-coming fruit behind it, yet the grooves or spirals are pronounced enough to exert an advancing movement to the fruit or article along the valley when resting upon the cylinder. In rotating the brush 6 at a high speed, advantage can be taken of the resultant centrifugal force of said brush to effectively dispose of the moisture that it will gather from the wet fruit and dispense said moisture in spray or mist form. A hood or shield 11 may be arranged over each of the cleaning brush elements 6 for the purpose of collecting the moisture that will be thrown from these brushes due to their high rate of rotation. This accumulated moisture will eventually find its way to the drip pan 12 arranged beneath the bed of the machine and will be drained therefrom by the vent 13. A deflector plate 14 is secured to each hood, which plate is for the purpose of directing the fruit into the proper position to be acted upon by the revolving members 6 and 7.

The brush 6 is mounted at a slightly elevated position over that of the mounting of the feeding member 7, as is clearly shown in Figures 4 and 6, thereby forming an angular V-shaped trough for the reception of the fruit. If desired, a supporting rail 15 may be provided between each cleaning brush 6 and the feed member 7, as suggested in Figures 4 and 6. Provided on the forward end of each hood element 11 which extends over the top of its brush and terminates at the top of said V-shaped trough, is a bar member or abrupt surface 16 which extends substantially radially with respect to the brush on the valley side of the brush, thus constituting a retaining bar to prevent the fruit from being centrifugally thrown from the machine. In order to reduce this hazard to a minimum guard fingers or grid 17 is associated with each brush element 6 and extends from the forward end of the hood 11 to the rail 15. The intermediate portions of the fingers 17 are arcuate, conforming substantially to the contour of the brush and lie for a distance below a peripheral portion of the cleaning brush element 6. These guard fingers are intended to limit for a substantially uniform distance the degree of contact of the rotating brush with the surface of the fruit, or the like undergoing treatment in the machine, within the effective brushing area of the brush.

In order to remove the excess moisture that will necessarily accumulate on the slowly revolving feed brush or member 7, there is provided beneath each and in contact therewith a high speed auxiliary revolving brush element 18. These auxiliary brush elements are adapted to take the excess moisture from the feed member 7 and to centrifuge the same into the drain or drip pan 12.

There is positioned over the major portion of the machine an arched cover which for the sake of convenience is provided with hinged sections designated 19. In order to assist in the disposal of the mist or spray from beneath the arched cover, exhaust fans 20 may be positioned in any desired place within the roof of the arch or if preferred within the end walls, as shown in Figure 1.

At the entrance end of the machine there is provided a feed chute 21 by which the fruit is directed into the washing compartment A. This compartment may have a series of spray pipes 22 located therewithin and directly above the line of fruit undergoing treatment. Any type of washing solution may be used to cleanse the fruit, but it has been found that hot borax water is probably the best. From the washing compartment the fruit will be fed to the drying compartment B, and here the moisture is removed from the surface of the fruit. The final covered section of the machine is intended to be the polishing compartment C wherein the fruit is subjected to a buffing action to produce a polish thereon. To assist in this final operation an emulsified wax, powdered wax, or the like may be sprayed on the fruit from the conduit 23 shown in Figure 1. Also if desired, a heating element 24 may be arranged beneath the table at the polishing section of the machine.

Figure 2:
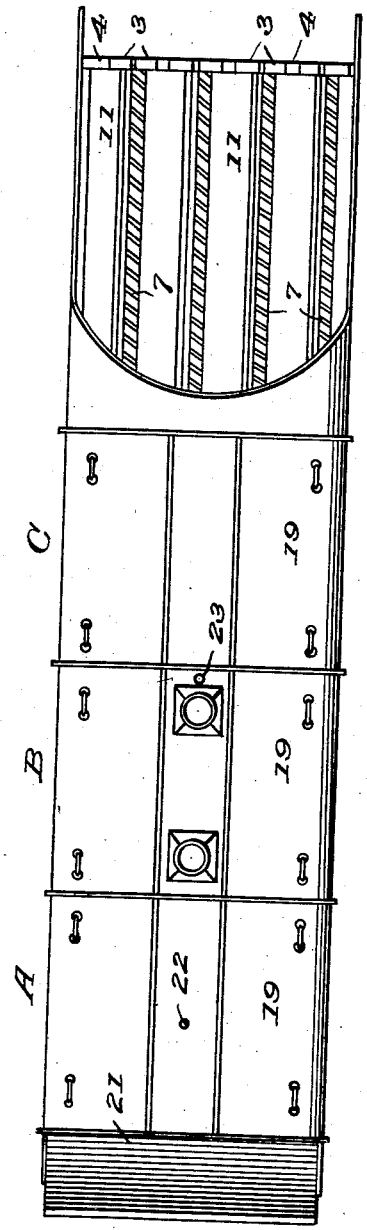
Figure 2 is a plan view of the structure shown in Figure 1.

The exit section of the machine may be left uncovered, as suggested in Figure 2, to permit the removal of the fruit.

The necessary power to operate the high speed brushes is furnished by a motor 25 which through transmission gearing located within box 26 drives the transversely arranged shaft 27. The shaft 27 has a pulley 28 for each brush element 6 and drives the latter through belt connections 29—29. The feed brushes or members 7 are driven by belt connections 30—30 from pulley 31 which in turn is driven from motor 32 through any conventional type of gearing arranged within boxing 33.

In Figure 8 there is shown a modified form of the machine in which the hood or shield is adjustable for the purpose of setting the machine to handle various sized fruits. In this form the hood is constructed of two plate members 34 and 35 hingedly connected together, as at 36. The plate member 34 is intended to direct the fruit into the trough between the cleaning and conveyor elements, while the plate member 35 acts as a bumper or retaining guard to prevent displacement of the fruit during the operations of the machine. The lower end of plate member 35 is pivotally secured to a pintle or the like, as suggested at 37. An inward extending strut or bar 38 is secured to the plate member 34, and a depending lever 39 is pivotally connected at 40 to said bar 38. The lever 39 is pivotally mounted as at 41 and is adapted to be moved through its connection 42 with an actuating rod 43. Any suitable means may be used to hold the actuating rod in its desired adjusted position; and as an illustration of one form, said rod may be serrated as at 44 for interlocking engagement with a tongue or stationary plate member 45.

Also shown in Figure 8 is a modified form of the guard plate or grid 17, which in this case is yieldingly supported in position on coiled spring members 46.

In Figure 9 the member 47 is intended to illustrate a belt which is arranged at an angle to the high speed revolving brush 6. This belt travels at a relatively low speed and progressively transports the fruit along the longitudinal face of the brush 6.

The operation of the machine is as follows:

The fruit or the like is fed into the inlet end of the machine and is immediately directed into the trough that is formed between the cleaning and the conveyor elements. During the transit of the fruit through the machine it will be constantly rotated or turned by the conveyor 7 so that the cleaning brush 6 will contact with the entire surface thereof. The cleaning solution will be sprayed onto the several lines of fruit within the washing compartment A, and said fruit in its transit through this compartment will be acted upon by the swiftly revolving cleaning brush 6. The feed member 7 will continue to advance the fruit into the next compartment which is designated the drying compartment B. The high speed of the cleaning brush elements 6 will cause them initially to take up the moisture from the surface of the fruit and subsequently to disperse said moisture by centrifugal action onto the inner surface of the overlying hood or directly into the drip pan arranged beneath the machine.

It will be noted that the guard or grid elements are associated with the cleaning brushes so as to be slightly within the peripheral edge of said brushes. This is for the purpose of limiting the action of the brush on the surface of the fruit or the like undergoing treatment. It has been found that the cleaning brush elements may be given an exceedingly high rate of rotation, as stated above, without any danger of throwing the fruit from the machine. The retaining element 16 that is formed along the forward edge of each shield 11 also assists in maintaining the fruit in the proper position or within the active zone of the cleaning brush elements if the machine is overloaded with fruit so that there is a crowding of the fruit over each other.

After the fruit has passed through the drying compartment B it enters into the polishing compartment C, and just prior to its entry therein it may be sprayed with a waxy solution which will materially assist in highly polishing the same and at the same time act as a preserver.

After leaving the polishing section the fruit is fed to the outer end of the machine where it may be removed and packed for shipment.

What I claim is:

1. In a fruit drying machine comprising a low speed feed member for conveying fruit through the machine, a high speed rotary brush element adapted to peripherally contact with the fruit while on the conveyor to remove the surface moisture therefrom, and a high speed revolving brush for removing the moisture accumulated on the feed member.

2. In a fruit drying machine comprising a slow speed feed member for conveying fruit through the machine, a high speed rotary brush element adapted to peripherally contact with the fruit while on the conveyor to remove the surface moisture therefrom, and a high speed rotatable member operatively associated with the feed member for removing the moisture accumulated on said feed member.

3. In a machine of the type described, for treating fruit or other rollable objects, comprising a rotatable brush of some length and means arranged at one side of the brush for conveying said objects along the length of said brush and forming a trough or valley therebetween for receiving said articles, means for rotating the brush at a high speed, a member extending substantially the length of the brush and lying radially beyond the brush and above said trough, and means for adjusting the position of said member about the axis of said brush and with respect to said trough for reducing the effective peripheral brushing area of the brush within said trough for articles of different sizes.

4. In a machine of the type described, for treating fruit or other rollable objects, comprising a rotatable brush of some length and means arranged at one side of the brush for conveying said objects along the length of said brush and forming a trough or valley therebetween for receiving said articles, means for rotating the brush at a high speed, a member extending substantially radially from the periphery of the brush, and means for adjusting the position of said means about the axis of the brush and with respect to said trough for reducing the effective peripheral brushing area of the brush within said trough, for articles of different sizes, said member being normally arranged with respect to the periphery of the brush to prevent the articles from being thrown from the machine by centrifugal force from the brush.

5. In a machine of the character described for treating fruit and other rollable objects, a plurality of rotatable brushes arranged in spaced relation and of some length, means for rotating said brushes at relatively high speed, conveyor means interposed between said brushes and forming valleys or troughs between them and said brushes extending longitudinally of the latter in which articles to be treated are disposed and fed along the length of the respective brushes, means for moving said conveyor means at a slower speed than said brushes, and adjustable means extending substantially the length of the respective brushes and lying substantially radially beyond each brush and above its associated trough, and means for simultaneously adjusting said last mentioned means for varying the effective brushing surface of each brush for fruit of varying sizes and positioned with respect to the periphery of its associated brush to prevent fruit in the respective troughs from being thrown therefrom by centrifugal force.

6. In a fruit cleaning machine comprising in combination a revolvable brush, a conveying mechanism arranged in longitudinal relation with the brush and adapted to transport fruit through the machine and in contact with the revolvable brush, and a series of bars spaced apart a distance less than the width of the fruit to be treated and each bar being of a width less than the width of the fruit being treated and arranged inwardly of the periphery of the revolvable brush, said bars being in planes perpendicular to the brush axis and arcuately bent longitudinally, the centers of said arcs being substantially on the axis of the brush, whereby to limit the degree of peripheral contact of the brush with the fruit.

7. In a fruit cleaning machine comprising in combination a rotatable brush on a substantially horizontal axis, a conveying means arranged in longitudinal relation with the brush to form a valley or trough therebetween to receive fruit and adapted to transport the fruit through the machine in contact with the revolvable brush, and means extending from the trough side of the brush and substantially radially therefrom to partially overhang the trough, whereby to prevent the ejection of the fruit from the machine by the centrifugal action of said brush.

EMMETT NICHOLSON.